United States Patent [19]

Rauschenfels

[11] 4,090,883
[45] May 23, 1978

[54] BUILDING MATERIAL REINFORCED WITH FIBERS OF GLASSY CALCIUM SILICATE

[75] Inventor: Eberhard Rauschenfels, Wiesbaden, Germany

[73] Assignee: Dyckerhoff Zementwerke Aktiengesellschaft, Wiesbaden - Amoneburg, Germany

[21] Appl. No.: 799,892

[22] Filed: May 23, 1977

[51] Int. Cl.$^2$ ............................................. C04B 7/02
[52] U.S. Cl. ....................................... 106/99; 106/104; 106/110; 106/118; 106/120
[58] Field of Search ................. 106/99, 104, 110, 118, 106/120

[56] References Cited

U.S. PATENT DOCUMENTS 3,887,386  6/1975  Majumdar ............................ 106/99
3,966,481  6/1976  Atkinson et al. ..................... 106/99

Primary Examiner—J. Poer
Attorney, Agent, or Firm—Burgess, Dinklage & Sprung

[57] ABSTRACT

In a building material comprising an inorganic binder selected from the group consisting of Portland cement, alumina cement, calcium silicate, lime and gypsum, structurally reinforced with glass fibers, the improvement which comprises employing as said glass fibers alkali-resistant calcium silicate glass fibers consisting essentially of approximately

| | |
|---|---|
| CaO | 26 – 50 % by weight |
| SiO$_2$ | 40 – 65 |
| Al$_2$O$_3$ | 1 – 8 |
| ZnO+ZrO$_2$+Cr$_2$O$_3$ | 0.1 – 10 |
| Fe$_2$O$_3$ and Na$_2$O | < 2. |

3 Claims, No Drawings

BUILDING MATERIAL REINFORCED WITH FIBERS OF GLASSY CALCIUM SILICATE

The object of the invention is to provide inorganic fibers which are especially suited for the production of fiber-reinforced, inorganically bonded building- and work materials. In the field of building materials these can be used in the production of reinforced cement building blocks, slabs, and the like.

These and other objects and advantages are realized in accordance with the present invention pursuant to which a synthetic melt after adjustment of its composition, is spun into filaments which are predominantly calcium silicate and which are of glassy rather than crystalline structure. The filaments are low in impurities, particularly iron as well as alkaline oxide impurities such as the oxides of magnesium, sodium, potassium, and the like, and exhibit marked resistance to alkali which therefore renders them suitable for uses in alkaline environments without loss of their strength, e.g. embedded in cement structures which contain and/or release alkali.

The fabrication of filaments of glassy structure from the melt of calcium silicate is surprising because, as is known, it is strongly inclined to crystallize and therefore wollatonite can be produced by simple tempering of the melt.

The instant invention concerns the use of calcium silicate fibers of glassy structure modified by admixed materials, to reinforce building materials made of inorganic binding agents. The additives can be used to adjust the pH of the glass fibers in water and thus adapt them to the respective pH value of the building material environment, as described more fully hereinbelow.

The calcium silicate fibers of glassy structure consist essentially of approximately 26–50% by weight CaO, 40–65% by weight $SiO_2$, 1–8% by weight $Al_2O_3$, 0.1–10% by weight of at least one modifying oxide selected from the group consisting of ZnO, $ZrO_2$, and $Cr_2O_3$ and less than 2% by weight of $Fe_2O_3$ and $Na_2O$.

In a preferred composition, the content of the modifying oxides in the fiber is from about 2 to 7% by weight.

The modified calcium silicate melt, from which the fibers are spun, is prepared from conventional glass raw materials. Preferred sources of $SiO_2$, $Al_2O_3$ and CaO include quartz, sand, caolin, clay, feldspar, limestone, chalk and calcspar. The ZnO is preferrably charged in the form of zinc-white and the $ZrO_2$ is preferrably charged as zirconium silicate. The chromium is preferrably added in the form of iron-free and magnesium-free chromium compounds. The raw materials must comply with the requirements regarding melting properties and fiber formation.

Especially preferred are glass fibers in the form of tows and endless glass fibers, glass fiber mats, rope-like constructions or sections of glass fiber bundles having a length between about 0.05 and 5.0 cm and a diameter of about 0.005 to 0.05 μm. They have a high modulus of elasticity within the range of about 4,000 to 7,000, preferably about 5,600 to 6,400 kp/mm² and tensile strength of the order of magnitude of about 60 to 130 kp/mm², preferably about 80 to 130 kp/mm². X-ray diffraction analyses establish that the modified calcium silicate fibers used according to the instant invention have no crystalline phase but are completely glassy solids.

The invention will be further described in the following illustrative examples wherein all parts are by weight unless otherwise expressed.

EXAMPLE 1

Glass melts of the following compositions by weight percent are produced:

|    | CaO  | $SiO_2$ | $Al_2O_3$ | $Fe_2O_3$ | $Na_2O$ | ZnO | $ZrO_2$ | $Cr_2O_3$ |
|----|------|------|-------|-------|------|-----|------|-------|
| a) | 29.2 | 53.0 | 7.9   | 0.1   | 0.4  | 5.6 | 3.8  |       |
| b) | 29.2 | 57.8 | 8.6   | 0.1   | 0.4  | 0   | 3.9  |       |
| c) | 33.0 | 57.4 | 5.3   | 0.1   | 0.4  | 0   | —    | 3.8   |
| d) | 29.0 | 51.8 | 8.1   | 0.1   | 1.5  | 5.6 | 3.8  |       |

The melt is spun through a platinum spinneret in conventional manner and thereby attenuated to form glassy filaments essentially comprising calcium silicate. The filaments average 10 μm in diameter and are circular in cross-section.

Several filaments are collected into endless strands to which the filaments are bound together by adding a binder, i.e. size. Several strands are brought together to form a roving. The endless roving is coiled into a roving package. The coiled roving is subsequently withdrawn, cut into short particles of 13 mm length and blown into a form simultaneously with a slurry of cement and water. The strands are held together only by twisting into rovings so that the rovings fall apart when chopped into short lengths. The fibers are present in about 4% by weigth of the dry cement. Upon setting and drying, shaped bodies result which are strong in tension as well as compression and which retain their strength even after prolonged exposure to a humid and/or wet atmosphere.

EXAMPLE 2

Glass fibers were produced in accordance with Example 1 with Various amounts of different additives and aqueous extracts thereof were compared as to pH value with extracts of glass fibers not in accordance with the invention. The results set forth in Table 1, show that the pH value of the extract varies with the particular additive. The pH values were obtained as follows: in each case 7 parts by weight of glass fibers of about the same length and diameter were shaken in plastic vessels with 10 parts by weight of doubly-distilled water and then the pH value of the fluid was determined four times within two weeks after settling of the solid material. The following pH values resulted:

Table 1

| Material | | Content of $SiO_2$ | CaO in % | pH value |
|---|---|---|---|---|
| a) | Silica-glass fiber (prior art) | 99 | — | 7.5 |
| b) | E-glass fiber (prior art) | 55 | 21 | 10.4 |
| c) | Glass fiber according to invention-no additive | 60 | 25 | 10.9 |
| d) | Glass fiber according to invention, with: | | | |
| I)   | 3.1 % $Cr_2O_3$ | 43 | 47 | 11.4 |
| II)  | 4.1 % $ZrO_2$ | 43 | 47 | 11.5 |
| III) | 2.9 % ZnO (Example 1) | 43 | 47 | 11.7 |
| IV)  | 1.1 % each of ZnO+$Cr_2O_3$+$ZrO_2$ | 43 | 47 | 11.5 |

The pH value can of course be adjusted by the amount of additive selected in each case. With knowledge of the pH value of the calcium silicate fibers if optimal applicability can also be determined, i.e. that particular fiber is employed for a particular use whose pH value is as close as possible or equal to the pH value of the environment of the building material. Fiber d(III) of Table 1 is especially suited for use in reinforcing building materials made from Portland cement.

EXAMPLE 3

It is known that the setting of Portland cement frees large amounts of $Ca(OH)_2$ which permanently remain in the cement. In order to ascertain the stability of fibers in accordance with the invention in an environment such as in hardened concrete, prisms of Portland cement having a dimension of 1 × 1 × 6 cm were wrapped and stored under water for 180 days at 20° C. Subsequently the free $Ca(OH)_2$ content of the prisms was chemically determined. These values were compared in each case with the value of the prisms which were produced without fibers but instead with an equal amount of material, which is not reactive with $Ca(OH)_2$, this value being taken as 100. Therefore, if the glass fibers react with the $Ca(OH)_2$ then the free $Ca(OH)_2$ content of the glass fiber-reinforced prisms must decrease. In Table 2 there are compiled the relative contents of free $Ca(OH)_2$ in different samples afer 180 days.

Table 2

| Prisms, produced by addition of 5 % of fibers | Relative content of free $Ca(OH)_2$ after 180 days |
| --- | --- |
| Without addition of fibers but with inactive replacement | 100 |
| Fibers without additive | 90 |
| Fibers with 4.1 % ZrO additive | 100 |
| 3.1 % $Cr_2O_3$ additive | 97 |
| 2.9 % ZnO additive | 99 |
| 1.1 % each of $ZrO_2+Cr_2O_3+ZnO$ | 100 |

It is evident that the fibers without additive reacted more strongly than the fibers with additive. It is also evident that the calcium silicate fibers used according to the invention have different reaction values according to the additive and the amount added. The results also show that the use of a calcium silicate fiber of glassy structure containing ZnO as additive is especially suitable for the reinforcement of concrete.

The modified calcium silicate fibers of glassy structure are also suitable for the reinforcement of concrete based on alumina cement and Portland cement. Even if the concrete does not have steel reinforcement, the novel fibers increase the tensile strength of concrete as well as its rigidity and impact strength and its resistance to chipping off a high temperature stress. The reinforcement of the concrete with glass fibers can be advantageously combined with that by steel inserts.

The modified calcium silicate fiber of glassy structure is furthermore suitable for the production of other cement based building materials, especially those heretofore reinforced with asbestos fibers such as patent plasters, finished mortars and plasters, as well as plates, corrugated plates, pressure tubes, flower boxes, gutters, roof gutter pipes and other products identified as asbestos cement articles. For such uses the building materials will generally range in thickness from about 3–40 mm and the reinforcing fibers will range in diameter from about 5–50 μm, preferably about 10–25 μm. The amount of fiber depends upon the desired end properties but about 3–5% by weigth of dry object is generally quite satisfactory.

In addition, the use of the modified calcium silicate fiber is possible in building materials based on other inorganic binding agents such as, for instance, building lime and gypsum.

Another interesting field of application is in hydrothermally hardened concretes. Here the modified glass fibers also serve as aggregate for the reinforcement of concrete. They react in the autoclave process only imperceptibly with the basic solution and therefore remain almost unchanged in their shape stability. Especially advantageous in this connection is their light color so that the calcium silicate concretes are not only reinforced in their strength but also keep their light or white color tone.

In addition it is possible to produce and use economically other especially laminar glass fiber cement articles which did not give satisfactory results with asbestos fibers because of unsuitable E-modul and/or impact strength.

It will be appreciated that the instant specification and claims are set forth by way of illustration and not limitation, and that various modifications and changes may be made without departing from the spirit and scope of the present invention.

What is claimed is:

1. In a building material comprising an inorganic binder selected from the group consisting of Portland cement, alumina cement, calcium silicate, lime and gypsum, structurally reinforced with glass fibers, the improvement which comprises employing as said glass fibers alkali-resistant calcium silicate glass fibers containing at least one modifying oxide selected from the group consisting of ZnO, $ZrO_2$ and $Cr_2O_3$ said fibers consisting essentially of approximately

| | |
| --- | --- |
| CaO | 26 – 50 % by weight |
| $SiO_2$ | 40 – 65 % |
| $Al_2O_3$ | 1 – 8 |
| $ZnO+ZrO_2+CrO_3$ | 0.1 – 10 |
| $Fe_2O_3$ and $Na_2O$ | < 2 |

2. A building material according to claim 1, wherein the content of $ZnO + ZrO_2 + Cr_2O_3$ in the fiber is from about 2 to 7% by weight.

3. A building material according to claim 1, wherein an aqueous extract of the inorganic binder has a pH value approximately equal to that of an aqueous extract of the calcium silicate fiber.

* * * * *